United States Patent [19]

Bellinger

[11] Patent Number: 4,570,577

[45] Date of Patent: Feb. 18, 1986

[54] UNIVERSAL ANIMAL GROOMING POST

[76] Inventor: Gary R. Bellinger, 9635 Rosecrans Ave., Bellflower, Calif. 90706

[21] Appl. No.: 624,908

[22] Filed: Jun. 26, 1984

[51] Int. Cl.$^4$ ................................................ A01K 1/04
[52] U.S. Cl. ................................... 119/102; 119/122; 119/124
[58] Field of Search ............... 119/103, 117, 102, 122, 119/124; 248/122, 166, 169

[56] References Cited

U.S. PATENT DOCUMENTS

| | | | |
|---|---|---|---|
| 341,488 | 5/1886 | Koeller | 119/124 |
| 554,963 | 2/1896 | Spratt | 119/124 |
| 1,239,136 | 9/1917 | Stone | 248/169 X |
| 3,580,222 | 5/1971 | Dunn | 119/102 |
| 3,896,769 | 7/1975 | McGehee | 119/122 |

FOREIGN PATENT DOCUMENTS 720191  4/1942  Fed. Rep. of Germany ...... 119/122

*Primary Examiner*—Hugh R. Chamblee
*Attorney, Agent, or Firm*—Charles H. Thomas

[57] ABSTRACT

A univeral animal grooming post is provided which accommodates animals of varying sizes without the necessity for adjusting the mounting of the post on a grooming table. The universal grooming post includes a hollow upright stanchion and a hollow arm projecting laterally therefrom. A tether is provided which includes an inelastic portion protruding from the laterally projecting arm and an elastic portion coupled thereto that is secured within the stanchion. A locking mechanism allows a selected length of the inelastic portion of the tether to extend from the arm. A greater length of the inelastic portion of the tether extends from the arm to accommodate small animals, while the locking mechanism is adjusted to allow a much shorter length of the inelastic portion of the tether to extend from the arm to accommodate animals of larger size.

5 Claims, 4 Drawing Figures

UNIVERSAL ANIMAL GROOMING POST

BACKGROUND OF THE INVENTION

1. Field of the Invention

The present invention relates to grooming posts for tethering animals on a grooming table to facilitate grooming.

2. Description of the Prior Art

Numerous tethering devices have been devised to restrain the movements of animals for purposes of administering training, grooming or veterinary treatments and examinations. Devices known as grooming posts are frequently used to tether animals in such environments. Grooming posts are widely used in animal grooming parlors, veterinary clinics, and at obedience training schools.

A typical grooming post is formed by an upright standard or stanchion which has a laterally projecting arm at its upper extremity. A hook or loop is provided near the end of the laterally projecting arm to receive a leash or for connection to the collar of an animal. Since different breeds of animals vary considerably in size some means for adjusting the height of the tethering arm is necessary. Typically, height adjustment is provided by adjustably locking the upright stanchion so as to hold the tethering arm at a selected height above a grooming table.

With the grooming posts which have heretofore been available, height adjustments can be performed only ackwardly and with difficulty. The upright stanchion of a typical grooming post is normally mounted on the side of the grooming table opposite the side at which the groomer or trainer works. This arrangement places the upright stanchion out of the way of the groomer or trainer so that the stanchion does not present an interfering structure. However, since the stanchion is mounted on the far side of a table, the mounting mechanism can be adjusted only with considerable difficulty. The trainer may walk to the far side of the grooming table to effectuate a height adjustment of the upright stanchion to accommodate the particular animal to be groomed or trained. Once the mounting mechanism has been adjusted the trainer or groomer must return to the opposite side of the grooming table. Manipulation of the mounting mechanism must be performed while attempting to restrain an animal on the grooming table before the animal has been properly tethered. As a result it is rather difficult to vertically adjust the height of a conventional grooming post. Moreover, grooming tables are often conveniently mounted against walls. In such a situation the groomer or trainer cannot walk to the far side of the grooming table, but must instead reach across and attempt to loosen the mounting mechanism, adjust the height of the grooming post, and retighten the mounting mechanism. These manipulations must be performed from a very awkward position leaning far over the table and while attempting to restrain an animal, which as of that time, is not properly tethered.

SUMMARY OF THE INVENTION

In one aspect the present invention is a universal animal grooming post formed of a hollow standard adapted for mounting to project upwardly from a fixed support and a hollow arm projecting laterally from the standard. Unlike conventional grooming posts, the present invention employs a tether which has both an elastic portion and an inelastic portion joined together. The elastic portion of the tether is secured within the standard and the inelastic portion passes within the arm to extend therefrom. A locking mechanism is provided for releasably securing the inelastic portion of the tether relative to the arm at a selected location along the inelastic portion to allow a selected length of the inelastic portion of the tether to extend from the arm. The length of the inelastic portion which extends from the arm is determined by the size of the animal. For large animals, such as German shepherds, Doberman pinschers and Great Danes, only a very short length of the inelastic portion of the tether will extend from the tethering arm. In contrast, a considerable length of the inelastic portion of the tether will extend from the arm to restrain the movements of toy poodles, terriers and other small animals.

It is an object of the present invention to provide a means for adapting a grooming post to animals of different sizes without the necessity for adjusting the mounting of the upright post on the grooming table. To the contrary, the position of the upright standard or stanchion of the grooming post of the inevention is not adjusted at all. Rather, the length of the inelastic portion of the tether which extends from the grooming post arm is adjusted. Since the grooming post extends toward the trainer or groomer at some distance above the grooming table, manipulation of the locking mechanism is performed within easy reach of the groomer or trainer and approximately at eye level. Moreover, it is unnecessary for the groomer or trainer to sprawl across the width of the table in order to effectuate an adjustment, as is necessary with conventional grooming posts. The necessary adjustment is performed in the grooming post of the invention with far greater ease than has heretofore been the case.

The locking mechanism in the grooming post of the invention locks the inelastic portion of the tether to provide an effective length suitable to the size of the animal to be restrained. By securing the inelastic portion of the tether to either the grooming post stanchion or the grooming post arm, any force which the animal may exert on the tether will not act upon the elastic portion of the tether, but rather will act only upon the effective length of the inelastic portion and through the rigid structure of the locking mechanism and the grooming post arm and stanchion. The animal is thus unable to extend the length of the tether by pulling on the elastic portion thereof. Nevertheless, the elastic portion allows the trainer or groomer to selectively adjust the effective inelastic length of the tether.

A further feature of the preferred embodiment of the grooming post of the invention is the feature of collapsibility. Preferably the laterally projecting arm is joined to the upright stanchion by a hinge, and a releasable brace selectively holds the arm to project laterally outwardly from the stanchion. When the brace is released the arm collapses alongside the stanchion. The arm thus projects outwardly over the grooming table only when desired by the groomer or trainer. With conventional fixed grooming post arms, groomers and trainers are continually bumping into the laterally projecting arms. Conventional, fixed arms present a constant source of minor injury, and serious injuries do sometimes occur. With the preferred embodiment of the grooming post of the invention, however, the hazard of the outwardly projecting grooming post arm can be eliminated except when the grooming post is actually in use.

A further feature of the preferred embodiment of the invention is that the releasable brace enhances the structural rigidity of the grooming post. The brace, when engaged to hold the arm in a laterally outwardly projecting condition, supports the arm so that greater structural rigidity is provided in contrast to the conventional cantilevered mounting of grooming post arms.

A further feature of the preferred embodiment of the invention is that height adjustment can be performed easily to accommodate either a leash for attachment to the collar of an animal, or a sling which passes beneath the lower abdomen of the animal to support the animal's hindquarters. Such a sling is known in the trade as a "butt strap", the primary purpose of which is to force the animal to stand on all four legs and to prevent it from sitting on its rear haunches.

The various features of the invention may be illustrated with greater clarity and particularity by reference to the accompanying drawings.

DESCRIPTION OF THE EMBODIMENT

Figure 1:
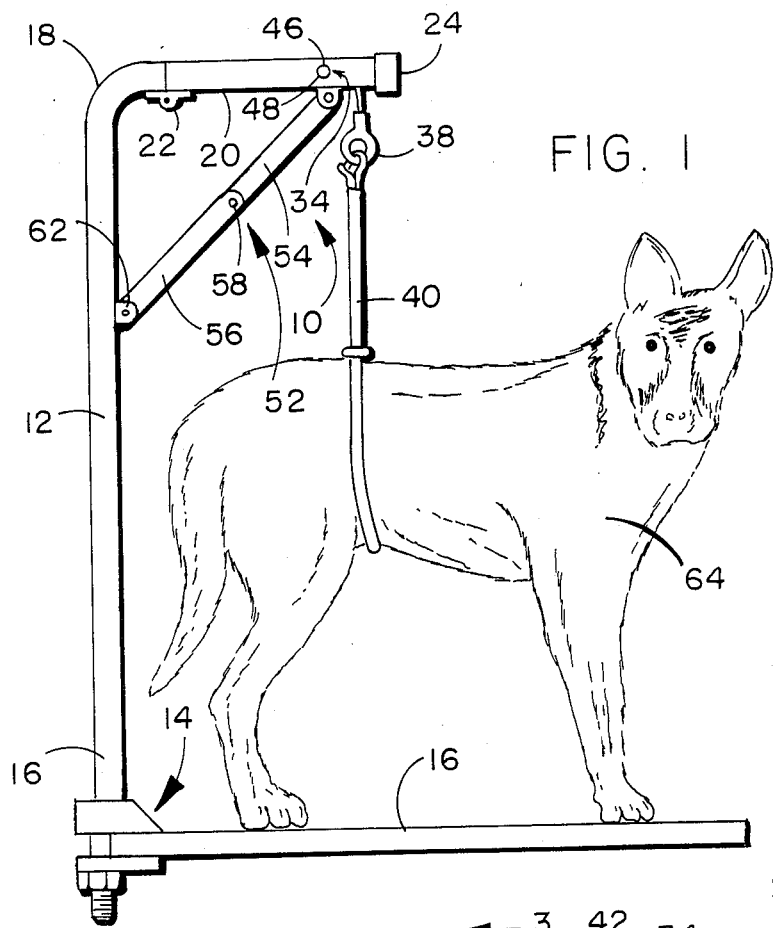
FIG. 1 is an elevational view illustrating a preferred embodiment of the universal animal grooming post of the invention.

FIG. 1 illustrates an animal grooming post 10 according to the invention. The animal grooming post 10 is comprised of a hollow, upright, tubular stanchion 12 having a generally square outer cross section and normally formed of stainless steel or aluminum. The stanchion or standard 12 has a mounting mechanism 14 at its lower end 16. The mounting mechanism 14 is designed to releasably clamp onto the edge of a flat, expansive, dog grooming table 16. The upper end 18 of the stanchion 12 turns in a short elbow and is joined to a hollow, laterally extending tubular arm 20 by means of a hinge 22. The tubular arm 20 is also formed of square stainless steel or aluminum tubing and terminates at its extremity in a rubber cap 24. The rubber cap 24 serves to prevent injury should someone strike their head on the projecting end of the hollow arm 20.

The animal grooming post 10 also has a tether 26 formed from an inelastic portion 28 which is joined to an elastic portion 30. The lower end of the elastic portion 30 of the tether 26 is securely fastened to the lower end 16 of the upright stanchion 12. The upper end of the elastic portion 30 of the tether 26 terminates in a loop 32 which is connected to one end of the inelastic portion 28 of the tether 26. The elastic portion 30 of the tether 26 may be formed from a bungee cord.

The inelastic portion 28 of the tether 26 is disposed within the upright stanchion 12 and extends through the elbow 18 thereof and into the hollow arm 20. The inelastic portion 28 of the tether 26 passes through a locking mechanism, indicated generally at 34, and through a grommet 36 disposed in an opening in the wall of the arm 20. The grommet 36 is provided to prevent the inelastic portion 28 of the tether 26 from chafing where it leaves the interior of the arm 20. The terminal end of the inelastic portion 28 of the tether 26 culminates in a metal ring 38 to which a leash or "butt strap" 40 may be connected.

The releasable locking means 34 is constructed to releasably secure the inelastic portion 28 of the tether 26 relative to the arm 20 to allow a selected length of the inelastic portion 28 of the tether 26 to protrude from the arm 20. The locking mechanism 34 is formed of a guide 42 which is a steel bar of square cross sectional configuration that fits snugly within the tubing of which the arm 20 is formed. A longitudinal opening 44 is bored through the bar 42 to receive the inelastic portion of the tether 28. The bore 44 is flared at both ends to minimize chafing on the inelastic portion 28 of the tether 26. The inelastic portion 28 of the tether 26 may be formed of a nylon cord of up to number 500.

Figure 3:
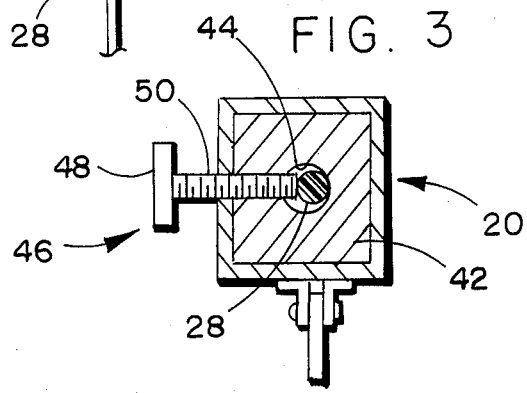
FIG. 3 is a transverse sectional view taken along the lines 3—3 of FIG. 2

As illustrated in FIG. 3 there is a transverse opening defined in the guide 42 which intersects the longitudinal opening 44. The guide 42 is positioned so that the transverse opening therein is in alignment with a transverse opening in the arm 20. A clamping pin 46, which serves as a set screw, has a discshaped head 48 with a knurled outer periphery and a threaded shank 50. The shank 50 is treadably engaged in both the transverse opening in the arm 20 and the aligned transverse opening in the guide 42. The clamping pin 48 may be treadably engaged and disengaged to reciprocally move relative to the inelastic portion 28 of the tether 26. When the set screw 46 is tightened the end of the shank 50 thereof bears against the inelastic portion 28 of the tether 26 so as to clamp the inelastic portion 28 against the guide 42 to longitudinally immobilize the inelastic portion 28 of the tether 26 within the arm 20. Alternatively, the set screw 46 can be loosened to allow the inelastic portion 28 of the tether 26 to be longitudinally adjusted, so as to vary the length of the inelastic portion 28 which extends from the arm 20.

Figure 4:
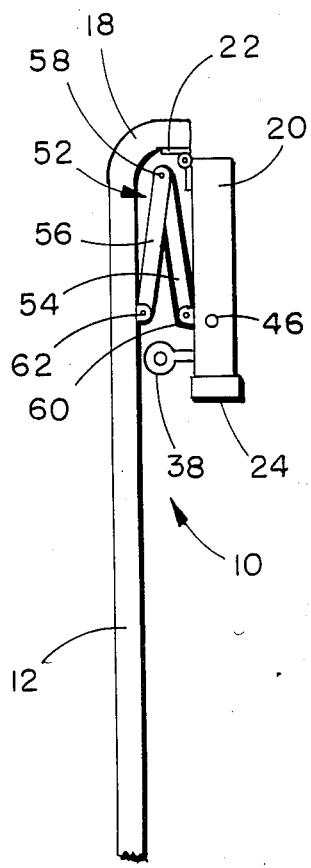
FIG. 4 is an elevational view of the upper portion of the grooming post of FIG. 1 with the grooming post arm in a collapsed condition.
Figure 2:
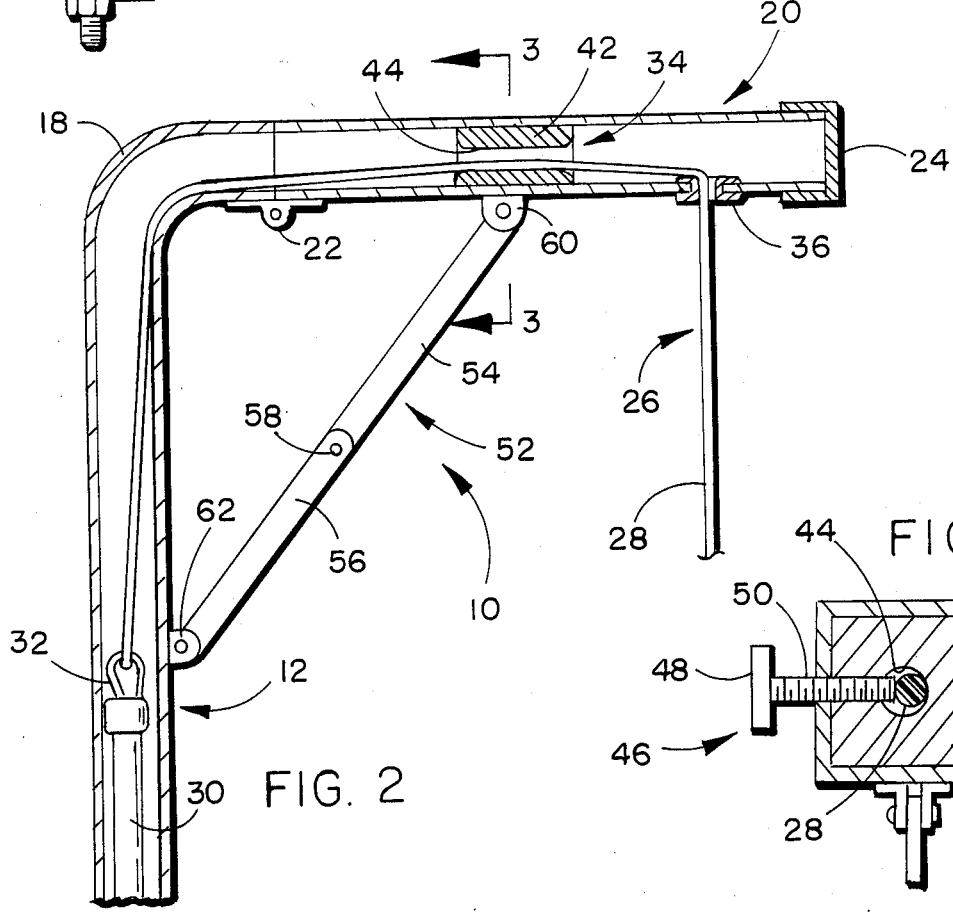
FIG. 2 is a sectional elevational view of the upper portion of the universal grooming post of FIG. 1.

In the preferred embodiment of the invention depicted, the universal animal grooming post 10 also includes a releasable brace 52 to selectively hold the arm 20 to project laterally from the stanchion 12 as depicted in FIGS. 1 and 2. Alternatively, the brace 52 can be released to allow the arm 20 to collapse alongside the stanchion 12 as depicted in FIG. 4.

The brace 52 is formed by a pair of links 54 and 56. The links 54 and 56 are joined by a pivot pin 58 which may be manipulated to lock the links 54 and 56 together in the positions depicted in FIGS. 1 and 2 by means of a detent latch. Many detent latching braces of the type employed are found in such articles as card tables, drop leaf tables and collapsible shelves.

The link 54 is connected at a rotatable connection to a pair of mounting brackets 60 depending from the underside of the grooming post arm 20. Comparable mounting brackets 62 pivotably connect the lower extremity of the link 56 to the upright stanchion 12.

In the operation of the universal grooming post 10 the mounting clamp 14 is secured to the grooming table 16 so that the stanchion 12 projects vertically upwardly and the grooming post arm 20 projects outwardly over the table 16 at a height sufficient to accommodate the largest breed of animal likely to be placed atop the grooming table 16. In the illustration of FIG. 1 a large dog 64 is depicted on the grooming table 16.

Once the mounting clamp 14 has been set, it need not be adjusted again. When a large dog, such as the dog 64 in FIG. 1, is to be groomed, it is placed atop the grooming table 16. The knurled knob 48 is turned to loosen the set screw 46. The shank 50 thereby withdraws from clamping engagement against the inelastic portion 28 of the tether 26. This allows the elastic portion 30 of the tether 26 to contract to draw up any slack in the inelastic portion 28 to thereby snugly draw upon any leash or "butt strap" 40, as depicted in FIG. 1. Once the leash or "butt strap" has been snugly drawn so that the animal 64 is closely tethered, the knob 48 is turned to tighten the shank 50 to bear against the inelastic portion 28 of the tether 26 in the manner depicted in FIG. 3. Any force exerted on the tether 26 by the animal 64 will act only upon inelastic structure in the grooming post 10. That is, if the animal 64 attempts to sit down it will be unable to do so since its hind quarters will be held up by the "butt strap" 40, the length of the inelastic portion 28 of the tether 26 between the ring 38 and the set screw 46, and by the structure of the grooming post arm 20 and the upright stanchion 12. A similar result is achieved when a leash is attached to the collar of the animal 64 and to the tether ring 38.

If a smaller animal is to be groomed, the set screw 46 is again loosened and a significantly longer length of the inelastic portion 28 of the tether 26 is drawn out of the arm 20. The elastic portion 30 of the tether 26 will stretch to accommodate this additional length of the inelastic portion 28. The set screw 46 is thereupon clamped again when an appropriate length of the inelastic portion 28 has been drawn from the arm 20.

When the animal 64 has been removed from the grooming table 16 the grooming post arm 20 may be collapsed to fold alongside the upright stanchion 12 by disengaging the detent mechanism of the brace 52. The links 54 and 56 of the brace 52 fold together in a scissors-like fashion as depicted in FIG. 4. The grooming post arm 20 thereby is removed as an outwardly projecting obstruction and is unlikely to cause injury. With the set screw 46 loosened the elastic portion 30 of the tether 26 draws the ring 38 up against the arm 20.

Undoubtedly numerous variations and modifications of the grooming post of the invention will become readily apparent to those familiar with the grooming and veterinary treatment of animals. Accordingly, the scope of the invention should not be construed as limited to the specific embodiment depicted and described, but rather is defined in the claims appended hereto.

I claim:

1. A universal animal grooming post comprising a hollow standard adapted for mounting to project upwardly from a fixed, elevated top of an animal grooming table, a hollow arm projecting laterally from said standard, a tether having an inelastic portion and an elastic portion joined together, wherein said elastic portion is secured within said standard and said inelastic portion passes within said arm that extends therefrom, and manually actuatable locking means located on said arm and engageable with said inelastic portion of said tether to longitudinally immobilize said tether so that only a selected length of said inelastic portion of said tether extends from said arm while said locking means remains engaged despite longitudinal force on said inelastic portion of said tether and said locking means is releasable to allow said elastic portion of said tether to draw said inelastic portion thereof towards said arm, and wherein said locking means includes guide means for forming a longitudinal opening of cross section reduced from that of said hollow arm wherein said inelastic portion of said tether passes through said longitudinal opening, and clamping means for acting transversely against said inelastic portion of said tether at said longitudinal opening.

2. A universal animal grooming post according to claim 1 further comprising a strap releasably coupled to said tether for supporting the hindquarters of an animal.

3. An animal grooming post comprising a hollow upright stanchion having upper and lower ends with mounting means at said lower end adapted for attachment to a fixed, elevated top of an animal grooming table and a hollow, laterally extending arm at said upper end, a tether having an inelastic portion protruding from said arm and extending internally within said arm towards said stanchion and an elastic portion having opposite ends, one of which is connected to said inelastic portion of said tether and the other of which is secured within said stanchion, and manually actuatable releasable locking means for releasably securing said inelastic portion of said tether relative to said arm to longitudinally immobilize said inelastic portion of said tether and allow only a selected fixed length of said inelastic portion of said tether to protrude from said arm while said locking means remains engaged despite the application of longitudinal force on said inelastic portion of said tether, whereby when said locking means is released said elastic portion of said tether draws said inelastic portion of said tether into said arm, and wherein said locking means includes guide means for forming a longitudinal opening of cross section reduced from that of said hollow arm wherein said inelastic portion of said tether passes through said longitudinal opening, and clamping means for acting transversely against said inelastic portion of said tether at said longitudinal opening.

4. An animal grooming post according to claim 3 in which said stanchion and said arm are joined at a hinge and further comprising a releasable brace to selectively hold said arm to project laterally from said stanchion and alternatively to allow said arm to collapse alongside said stanchion.

5. An animal grooming post comprising a hollow upright stanchion having upper and lower ends with mounting means at said lower end adapted for attachment to a fixed elevated support, a hollow arm extending laterally from said upper end of said stanchion, a tether having both elastic and inelastic portions attached together, and said elastic portion has a lower end secured within said stanchion and said inelastic portion has a terminal end extending from said arm, and releasable locking means for selectively locking said inelastic portion of said tether relative to said arm to adjust to a fixed, inextensible length the terminal portion of said tether which extends from said arm despite the application of longitudinal force on said inelastic portion of said tether, and werein said locking means includes guide means for forming a longitudinal opening of cross section reduced from that of said hollow arm wherein said inelastic portion of said tether passes through said longitudinal opening, and clamping means for acting transversely against said inelastic portion of said tether at said longitudinal opening.

* * * * *